United States Patent
Baier et al.

(10) Patent No.: US 9,352,657 B2
(45) Date of Patent: May 31, 2016

(54) MOTOR VEHICLE DEVICE

(75) Inventors: Karlheinz Baier, Ostfildern (DE);
Matthias Kronewitter, Esslingen (DE);
Thomas Weber, Herrenberg (DE)

(73) Assignee: Daimler AG, Stuttgart (DE)

( * ) Notice: Subject to any disclaimer, the term of this patent is extended or adjusted under 35 U.S.C. 154(b) by 138 days.

(21) Appl. No.: 13/996,942

(22) PCT Filed: Nov. 16, 2011

(86) PCT No.: PCT/EP2011/005758
§ 371 (c)(1),
(2), (4) Date: Jul. 23, 2013

(87) PCT Pub. No.: WO2012/084099
PCT Pub. Date: Jun. 28, 2012

(65) Prior Publication Data
US 2013/0300364 A1    Nov. 14, 2013

(30) Foreign Application Priority Data

Dec. 23, 2010 (DE) .......................... 10 2010 055 925

(51) Int. Cl.
*H02J 7/00* (2006.01)
*B60L 11/18* (2006.01)

(52) U.S. Cl.
CPC ........... *B60L 11/1809* (2013.01); *B60L 11/182* (2013.01); *B60L 11/1816* (2013.01); *B60L* (Continued)

(58) Field of Classification Search
CPC ............ B60L 11/1809; B60L 11/1816; B60L 11/182; B60L 11/1846; B60L 11/1848; Y02T 10/7005; Y02T 90/121; Y02T 90/122; Y02T 90/128; Y02T 90/14; Y02T 90/163; Y02T 90/169; Y02T 10/7088; Y04S 30/14
See application file for complete search history.

(56) References Cited

U.S. PATENT DOCUMENTS 8,427,103 B2    4/2013  Ohtomo
2009/0079389 A1*  3/2009  Ohtomo ........................ 320/109
(Continued)

FOREIGN PATENT DOCUMENTS

EP    2 431 212 A1    3/2012
EP    2 431 214 A1    3/2012
(Continued)

OTHER PUBLICATIONS

German-language Written Opinion (PCT/ISA/237) dated Apr. 23, 2013 (Seven (7) pages).
(Continued)

*Primary Examiner* — Nha Nguyen
(74) *Attorney, Agent, or Firm* — Crowell & Moring LLP

(57) ABSTRACT

An electrical and/or hybrid motor vehicle device includes a charging device for the charging of an accumulator device. The charging device includes a first charging unit with a connector element for the charging of the accumulator device, which is provided for energy transfer by means of contacts. The charging device also includes a second charging unit with an energy transfer unit for the charging of the accumulator device, which is provided for a contactless energy transfer. The charging device has a charging electronic system, which is provided at least in part as an integral construction with the first and second charging units.

4 Claims, 1 Drawing Sheet

(52) U.S. Cl.
CPC 11/1846 (2013.01); *B60L 11/1848* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2010/0109604 A1 | 5/2010 | Boys et al. |
| 2010/0225274 A1* | 9/2010 | Fujitake .................. 320/109 |
| 2011/0225105 A1* | 9/2011 | Scholer et al. ............. 705/412 |

FOREIGN PATENT DOCUMENTS

| | | |
|---|---|---|
| JP | 2008-220130 A | 9/2008 |
| JP | 2009-77557 A | 4/2009 |
| WO | WO 2010/131349 A1 | 11/2010 |

OTHER PUBLICATIONS

English translation of International Preliminary Report on Patentability (PCT/IB/373) with Written Opinion (Nine (9) pages).
Japanese Office Action dated Jul. 29, 2014, with English translation (Ten (10) pages).
International Search Report dated Apr. 23, 2013 including English-language translation (Six (6) pages).

* cited by examiner

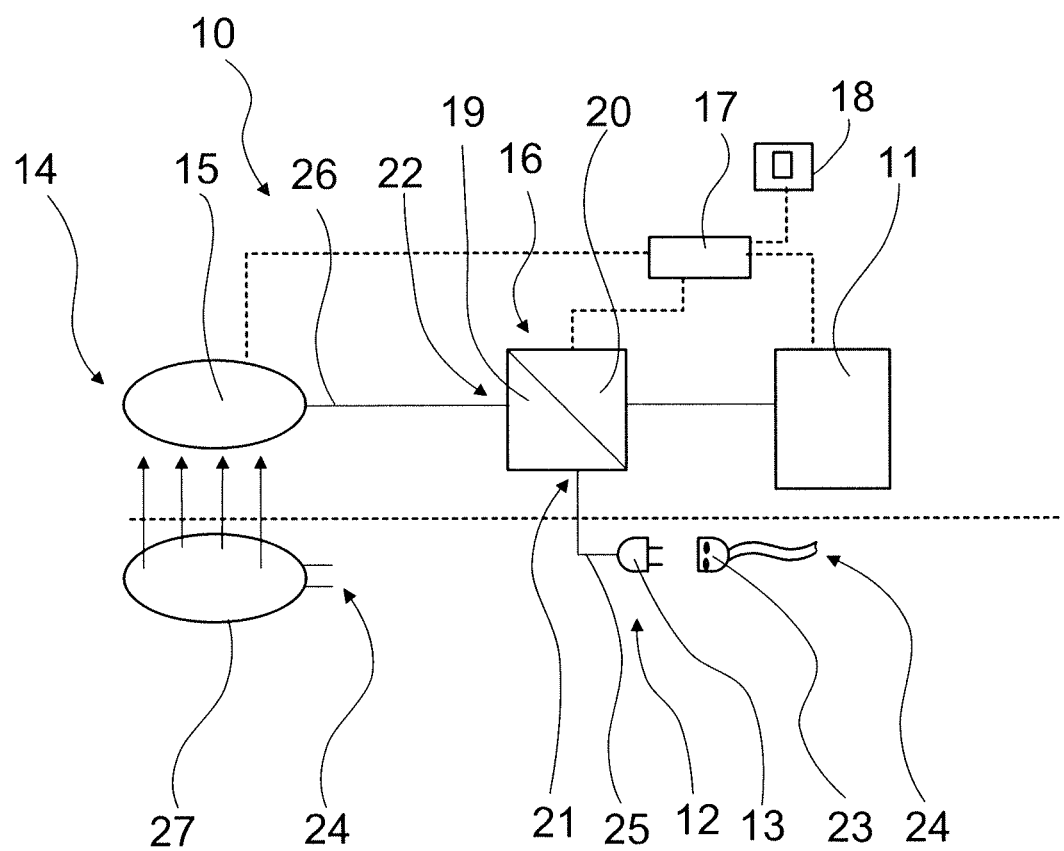

MOTOR VEHICLE DEVICE

BACKGROUND AND SUMMARY OF THE INVENTION

Exemplary embodiments of the present invention relate to a motor vehicle device.

US Patent Application Publication 2010/0109604 A1 discloses a an electrical and/or hybrid motor vehicle device with a charging device for charging an accumulator device, which has a first charging unit, which has a connector element for the charging the accumulator device, which is provided for energy transfer by means of contacts, and has a second charging unit, which has an energy transfer unit for the charging of the accumulator device, which is provided for a contactless energy transfer.

Exemplary embodiments of the present invention relate to a motor vehicle device, in particular an electrical and/or hybrid motor vehicle device, with a charging device for the charging an accumulator device, which has a first charging unit, which has a connector element for charging the accumulator device, which is provided for energy transfer by means of contacts, and has a second charging unit, which has an energy transfer unit for the charging the accumulator device, which is provided for a contactless energy transfer.

In accordance with exemplary embodiments of the present invention, the charging device has a charging electronic system, which is provided in an, at least partly, integral construction for at least two charging units. Accordingly, a separate charging electronic system for each charging unit is not required and thus the number of components can be kept to a minimum. An "accumulator device" should be understood as a device for the temporary storage of electrical energy. A "connector element" should be understood as a connector with integrated electrical contacts, which can be mechanically separated and joined together for the provision of an electrical connection with a correspondingly formed connector element. An "energy transfer unit" should be understood as a unit provided to receive or to send electrical energy on a zero contact basis. Here, preferably two energy transfer units are provided for a contactless transfer of electrical energy over a defined distance. The energy transfer unit preferably has at least one coil. The term "charging process" should be understood as a process by which an accumulator device of a motor vehicle is functionally linked with an external power source via the energy transfer units and thus is charged with electrical energy. A "contactless energy transfer" should be understood as an electromagnetic, preferably an inductive energy transfer. "Provided" should be understood as specially programmed, designed and/or equipped. The term "charging electronics" in this context should be understood as a combination of high-voltage electrical components, which are provided at least for a charging and/or discharging process.

Furthermore, the charging electronic system has a switching unit, by means of which switching can take place between the two charging units. Accordingly, an advantageous switchover between the two charging units can be made in order to charge the accumulator device via one of the charging units. The term "switching unit" should be understood as a switching logic, which has two inputs for the charging units and one output, which can be functionally connected with one of the inputs of the charging units.

Additionally, the charging electronic system has a rectifier, which is provided for a transfer of energy for both charging units. Accordingly, a current of the first and the second charging unit can be advantageously converted. The term "rectifier" should be understood as a device that converts an alternating current into a direct current.

Moreover, the motor vehicle device has a control and/or regulation unit, which is provided for the detection of the active charging unit. Accordingly, a particularly advantageous and simple method is obtained of determining which charging unit can be used to charge the accumulator device. The term "control and/or regulation unit" should be understood as a unit with at least one control device. The term "control device" should be understood as a unit with a processor unit and with a memory unit as well as an operating program stored in the memory unit. Fundamentally the control and/or regulation unit can have a number of control devices linked together, which preferably are provided to communicate with each other via a bus system, in particular a CAN bus system. "Active" should be understood as a connection with the external mains supply. Preferably the accumulator device can be charged via an "active charging unit".

In addition, the control and/or regulation unit is provided to connect the accumulator device with the active charging unit via the switching unit. Accordingly, the charging unit can advantageously be simply connected with the accumulator device via which a charging process can take place. "Connect" should be understood as making an electrical contact. The electrical contact can also preferably take place through a number of components.

Further, the control and/or regulation unit is provided with a simultaneous activation of the charging units such that the switching unit is switched as a function of at least one charging parameter. Accordingly, a situation-related optimum charging option can be employed. "Simultaneous activation" should be understood as both charging units being active at a given point in time. Preferably both charging units are active one after the other. Fundamentally it is also possible that the charging units are active simultaneously. The term "charging parameter" should be understood as the data deposited in the control and/or regulation unit, which is aligned with current data of the imminent and/or current charging process.

Additionally, the charging parameter is dependent on at least one charging state of the accumulator device and/or of an available charging time. Accordingly, the charging device can be advantageously matched to the current situation. "Charging state of the accumulator device" should be understood as an energy content of the accumulator device, which can be determined via a voltage of the accumulator device in the unloaded state. "Available charging time" should be understood as a time that is available for the imminent or current charging process. Preferably the "available charging time" is input by an operator before the charging process.

In a particularly advantageous embodiment the motor vehicle device has an operating element, which is provided to enable the operator to directly select the charging unit. Accordingly, an operator can personally, advantageously select the charging unit. "Operating element" should be understood as an element provided so that in an operating process an input parameter of an operator can be accepted and, in particular, directly connected, whereby a contact with the operating element is sensed and/or an actuating force exerted on the operating element is sensed and/or forwarded mechanically for the actuation of a unit.

Further advantages result from the following description of the drawing. An example embodiment of the invention is represented in the drawing. The drawing, the description and the claims contain many features in combination. The specialist will also consider the individual features advantageously and summarize them in sensible further combinations.

BRIEF DESCRIPTION OF THE DRAWING FIGURE

FIG. 1 shows a schematic representation of a motor vehicle device, in particular of an electrical and/or hybrid motor vehicle device for a motor vehicle.

DETAILED DESCRIPTION

FIG. 1 shows a schematic representation of a motor vehicle device, in particular of an electrical and/or hybrid motor vehicle device for a motor vehicle. The motor vehicle is formed as an electrical and/or hybrid motor vehicle. The motor vehicle has a partly represented drive train with an electric motor drive unit as a means of propulsion. Fundamentally it is also possible that the drive train has a number of electric motor drive units. The motor vehicle has an accumulator device 11 provided to at least supply the electric motor drive unit with energy. Fundamentally it is also conceivable, that the motor vehicle has in addition to at least one electric motor drive unit, at least one internal combustion engine in the drive train.

The accumulator device 11 comprises a high voltage battery. The accumulator device 11 provides a direct-current voltage of at least 100 volts. The high voltage battery comprises a number of individual cells arranged in series. A minimum battery voltage is 105.6 volts. A maximum battery voltage is 413 volts, whereby fundamentally the maximum battery voltage can also be higher. The accumulator device 11 has two battery terminals, which respectively form one defined pole of the accumulator device 11.

The electric motor drive unit takes the form of a three-phase current motor. The electric motor drive unit comprises three motor coils. To provide an energy supply the electric motor drive unit comprises three separate phases. In a drive mode the electric motor drive unit generates a driving torque from the electrical power with which it is supplied. In a generator operating mode the electric motor drive unit generates electrical power from mechanical power supplied to it, which can be supplied to the electric motor drive unit, for example.

The motor vehicle device has a charging device 10 for the charging of the accumulator device 11. The charging device 10 comprises a first charging unit 12 and a second charging unit 14. The charging device 10 has a charging electronic system 16. The charging electronic system 16 is provided for both charging units 10, 14. The charging electronic system 16 has a switching unit 19. The switching unit 19 has a first input 21 and a second input 22. The first input 21 is connected with the first charging unit 12 and the second input 22 is connected with the second charging unit 14.

The charging electronic system 16 has a rectifier 20, which facilitates an energy transfer for both charging units 12, 14. The rectifier 20 has a switching logic, not described in greater detail, in order to rectify the voltages and currents of the charging units 12, 14. In a charging process, with which the accumulator device 11 is charged via the first charging unit 12, the rectifier 20 converts a three-phase current, which is fed from the first charging unit 12 via the switching unit 19 to the rectifier 20, into a direct current. In a charging process, in which the accumulator device 11 is charged via the second charging unit 14, the rectifier 20 converts an alternating current, which is fed from the second charging unit via the switching unit 19 to the rectifier 20, into a direct current.

The first charging unit 12 comprises a connector element 13 for an energy transfer process with contacts. For a charging process the connector element 13 is provided with a mechanically separable connection with a corresponding connector element 23, which is connected with an external mains supply 24. The charging unit 12 comprises a conductor 25, which connects the connector element 13 with the first input 21 of the switching unit 19. The conductor 25 is at least partly formed as a plastic-sheathed cable.

The second charging unit 14 has a vehicle-side energy transfer unit 15 for the charging of the accumulator device 11. The vehicle-side energy transfer unit 15 is provided for a contactless energy transfer. The vehicle-side energy transfer unit 15 has at least one coil for the contactless energy transfer. The charging unit 14 comprises a conductor 26, which connects the vehicle-side energy transfer unit 15 with the second input 22 of the switching unit 19. The vehicle-side energy transfer unit 15 is formed in a charging process as an energy receiver unit. The energy transfer unit 15 is integrated, fixed, in the motor vehicle. The vehicle-side energy transfer unit 15 is attached to a floor pan of the motor vehicle. Fundamentally it is also possible for the vehicle-side energy transfer unit 15 to be attached to another point of the electric and/or hybrid motor vehicle.

The vehicle-side energy transfer unit 15 is provided with the facility to be functionally connected to a stationary energy transfer unit 27. The stationary energy transfer unit 27 is fixed in location in surroundings, for example on a garage floor or another location, easily reached by means of the motor vehicle. The stationary energy transfer unit 27 is connected with the external mains supply 24. The stationary energy transfer unit 27 has at least one coil for a contactless energy transfer. In the charging process of the accumulator device 11 of the motor vehicle the stationary energy transfer unit 27 takes the form of an energy sender unit. The stationary energy transfer unit 27 is thereby preferably always located on a floor, however, it is also conceivable, that the stationary energy transfer unit 27 is arranged in another position, for example on a wall. For this reason the vehicle-side energy transfer unit 15 would have to have the second charging unit 14 appropriately attached to the motor vehicle, in order to facilitate the coupling of the two energy transfer units 15, 27.

The motor vehicle device has a control and regulation unit 17. The control and regulation unit 17 regulates at least the electric motor drive unit and the charging process of the accumulator device 11. The control and regulation unit 17 detects by means of a sensor device, not described here in greater detail, which of the two charging units 12, 14 is active, and thus connected with the external mains supply. The control and regulation unit 17 then connects the accumulator device 11 via the switching unit 19 merely with the active charging unit 12, 14 in that it controls the switching unit 19 accordingly.

A charging parameter is stored on the control and regulation unit 17. The charging parameter is at least dependent on a charging state of the accumulator device 11 and an available charge time. If both charging units 12, 14 are active, then the control and regulation unit 17 is able to switch the switching unit 19 depending on the charging parameter. If an available charging time and a charging state of the accumulator device 11 are minimal, then the charging parameter is formed in such a way, that the control and regulation unit 17 connects the first charging unit 12 with the accumulator device 11, since via these a higher energy transfer can take place. If an available charging time and/or the charging state of the accumulator device 11 are high, the charging parameter is formed in such a way, that the control and regulation unit 17 connects the second charging unit 14 with the accumulator device 11.

The motor vehicle device has an operating element 18, which is provided to enable an operator to directly select the charging unit 12, 14. The operating element 18 is thereby stationed in a position in the motor vehicle that is easily accessible to the operator, for example on a dashboard in the area of a driver. Actuation of the operating element 18 enables an operator to switch manually between the first charging unit 12 and the second charging unit 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An electrical or hybrid motor vehicle device, comprising:
   a charging device configured to charge an accumulator device, wherein the charging device comprises:
      a first charging unit with a connector element configured to charge the accumulator device, wherein the connector element is configured to transfer energy using contacts,
      a second charging unit with an energy transfer unit, the second charging unit is configured to charge the accumulator device, wherein the second charging unit is configured to transfer energy in a contactless manner,
      a charging electronic system that is an integral system for the first and second charging units, wherein the charging electronic system includes a switching unit configured to switch between the first and second charging units, and
      a control or regulation unit configured to detect which one of the first and second charging units is active,
   wherein when the first and second charging units are simultaneously active, the control or regulation unit switches the switching unit depending on a charging parameter,
   wherein the charging parameter is dependent on a charging state of the accumulator device and an available charging time,
   wherein if the available charging time and the charging state of the accumulator device are minimal then the control or regulation unit switches the switching unit to connect the first charging unit with the accumulator device,
   and wherein if the available charging time and the charging state of the accumulator device are high then the control or regulation unit switches the switching unit to connect the second charging unit with the accumulator device.

2. The motor vehicle device according to claim 1, wherein the charging electronic system includes a rectifier configured so that an energy transfer can take place using both charging units.

3. The motor vehicle device according to claim 1, wherein the control or regulation unit is configured to connect the accumulator device, via the switching unit, with the active one of the first and second charging units.

4. The motor vehicle device according to claim 1, further comprising:
   a control element configured to enable an operator to facilitate a direct selection of at least one of the first and second charging units.

* * * * *